A. MAY.
Butter-Workers.
No. 148,484.  Patented March 10, 1874.
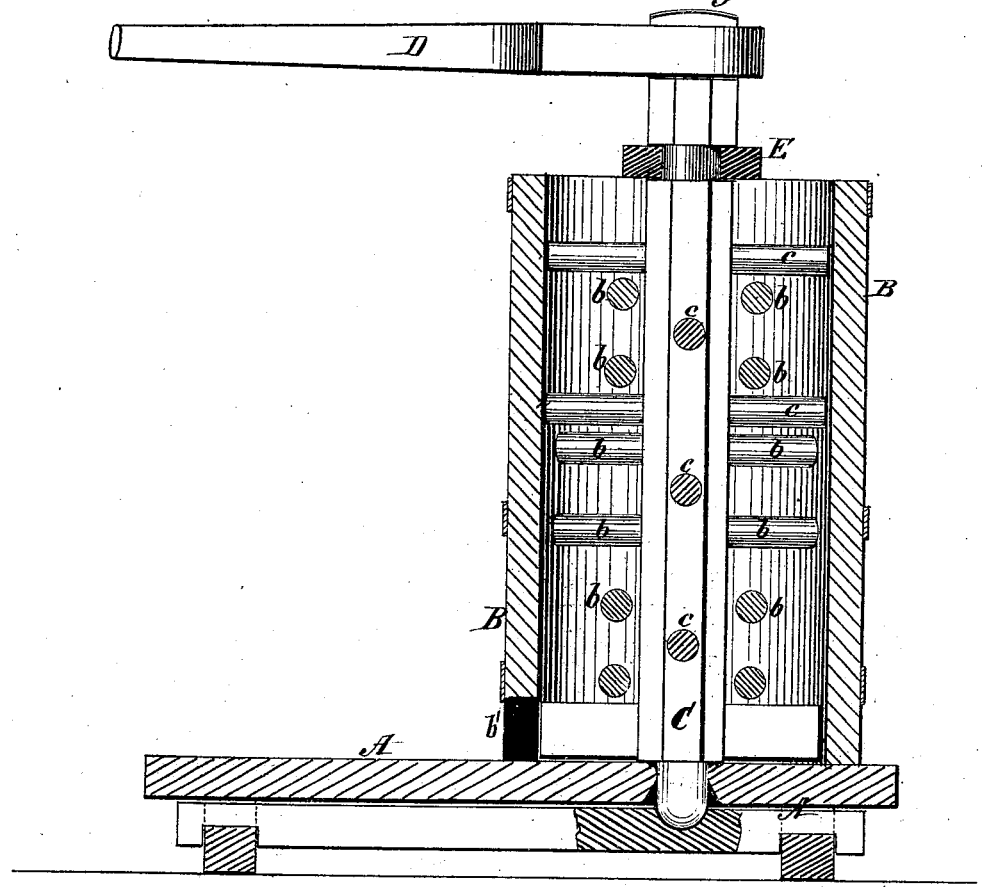
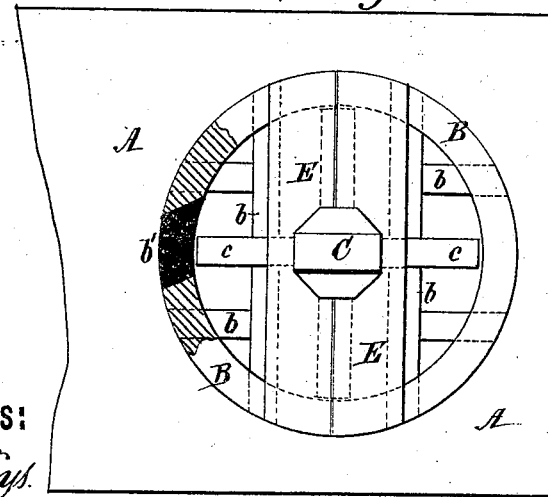

UNITED STATES PATENT OFFICE.

ALEXANDER MAY, OF JEFFERSONVILLE, INDIANA.

IMPROVEMENT IN BUTTER-WORKERS.

Specification forming part of Letters Patent No. 148,484, dated March 10, 1874; application filed February 2, 1874.

*To all whom it may concern:*

Be it known that I, ALEXANDER MAY, of Jeffersonville, in the county of Clarke and State of Indiana, have invented a new and Improved Butter-Mill for Working and Reworking Butter; and I do hereby declare that the following is a full, clear, and exact description of the same, reference being had to the accompanying drawing, forming a part of this specification, in which—

Figure 1 is a central vertical section. Fig. 2 is a top view, partly broken out.

The invention relates to means whereby butter may be thoroughly worked or reworked without manipulation, and in an easy, convenient manner.

The invention will first be fully described, and then pointed out in the claim.

A represents a horizontal platform, upon which is made fast the vessel or cylindrical body B, and in which rotates the central shaft C. On the inside of the body, and attached to the shaft, are placed, one above another, a series of rotary horizontal and rounded arms, c, each pair of arms being located at an angle to the pair above and below them. Across the body, and on two opposite sides, are made fast the stationary chord-pieces b, made preferably round, like the rotary arms. D is the sweep by which animal power may be applied to rotate the shaft C, and E the diametrical plate or board in which the shaft is journaled. The body B has, at the bottom and opening upon the platform A, the exit or discharge aperture b'. The latter is not made radial or in the direction of the shaft C, but is preferably oblique, to allow the butter to escape as the lower pair of rotary arms carry it around.

The mode of operation is as follows: The butter, newly made or otherwise, is inserted on either side of the diametrical board or plate E, and is then successively worked by pairs of rotary arms and stationary chord-bars until it reaches the bottom, and is discharged at the aperture b'. This serves to thoroughly work out the water and milk, thereby greatly improving the color and quality of the butter, which is solidified and condensed, so that it may be packed for market without any apprehension of spoiling, but with perfect confidence that, after transportation and the lapse of considerable time, it will be sweet and in fine condition, bringing the highest price of the market.

Having thus described my invention, what I claim as new, and desire to secure by Letters Patent, is—

A butter-worker consisting of the platform A, the body B, having cross-bars b and aperture b', and the shaft C, having arms c, all constructed and relatively arranged in the manner described.

The above specification of my invention signed by me this 23d day of January, 1874.

ALEXANDER MAY.

Witnesses:
PATRICK H. JEWETT,
CHARLES S. JEWETT.